United States Patent
Pfeffer et al.

(10) Patent No.: US 8,270,581 B2
(45) Date of Patent: Sep. 18, 2012

(54) SYSTEM AND METHOD FOR DISPLAYING CALLER IDENTIFICATION INFORMATION VIA AN INSTANT MESSAGING SERVICE

(75) Inventors: Howard Pfeffer, Reston, VA (US); Matthew Cannon, Sterling, VA (US); Richard N. Cho, Fort Lee, NJ (US)

(73) Assignee: Time Warner Cable, Inc., New York, NY (US)

( * ) Notice: Subject to any disclaimer, the term of this patent is extended or adjusted under 35 U.S.C. 154(b) by 1194 days.

(21) Appl. No.: 12/021,335

(22) Filed: Jan. 29, 2008

(65) Prior Publication Data

US 2009/0190732 A1 Jul. 30, 2009

(51) Int. Cl.
*H04M 1/56* (2006.01)
*H04M 15/06* (2006.01)

(52) U.S. Cl. .......... 379/142.07; 379/142.15; 379/211.02

(58) Field of Classification Search ............. 379/142.01, 379/142.04, 142.07, 142.1, 142.15, 207.16, 379/210.02, 211.01

See application file for complete search history.

(56) References Cited

U.S. PATENT DOCUMENTS

| | | | |
|---|---|---|---|
| 6,141,058 A | 10/2000 | Lagoni et al. | |
| 6,697,474 B1 | 2/2004 | Hanson et al. | |
| 6,782,086 B2 | 8/2004 | Clapper | |
| 2004/0096046 A1* | 5/2004 | Lection et al. | 379/142.06 |
| 2005/0020288 A1* | 1/2005 | Davis et al. | 455/466 |
| 2005/0053206 A1* | 3/2005 | Chingon et al. | 379/88.19 |
| 2005/0073999 A1* | 4/2005 | Koch | 370/352 |
| 2005/0180553 A1* | 8/2005 | Moore | 379/142.01 |
| 2006/0282450 A1* | 12/2006 | Barnes | 707/101 |

* cited by examiner

*Primary Examiner* — Quoc D Tran
(74) *Attorney, Agent, or Firm* — The Marbury Law Group, PLLC

(57) ABSTRACT

A telephone subscriber registers with a digital telephone service provider (DTSP) to obtain telephone service. The telephone subscriber also registers with an instant messaging service provider (IMSP) and receives a screen name. The telephone subscriber registers the screen name with the DTSP to receive caller identifying information (CID) via instant messaging (IM) (sometimes referred to herein as "CID IM service"). When a call to the telephone number of the telephone subscriber is received at a switch operated by the DTSP, the DTSP confirms that the telephone subscriber has registered a screen name with the DTSP and then sends the caller identification information to the IMSP. The IMSP then sends an instant message containing the caller identification information to the telephone subscriber's instant message client.

8 Claims, 3 Drawing Sheets

SYSTEM AND METHOD FOR DISPLAYING CALLER IDENTIFICATION INFORMATION VIA AN INSTANT MESSAGING SERVICE

BACKGROUND AND SUMMARY

Caller ID is a feature that provides identification information of a calling party to a called party thereby allowing the called party to identify the calling party prior to accepting the call. Normally, the calling party identifying information is displayed on a screen of the called party's telephone.

Telephone service provided over the public switched telephone network (PSTN) includes the calling party number (CPN) with every call, much like a return address on an envelope. Transmitted along with the CPN is a privacy flag that tells the telephone switch at the receiving end whether to share your number with the recipient. If blocking is implemented, the phone company receiving a call "knows" the calling party number but will not share it with the called party.

Telephone service that is provided over a digital network (e.g., VoIP telephone services) uses packets to convey call data, signaling data, and calling party information. Digital telephone service providers typically provide digital calls to subscribing parties over a packet switched network (e.g., a cable network or the Internet) while interfacing with the PSTN to receive calls from and send calls to PSTN-based telephone numbers.

In a cable environment, digital telephone service is provided over a high speed data (HSD) segment of the hybrid fiber coax (HFC) network. Typically, a digital telephone subscriber is also a subscriber of the HSD services of a cable provider. Thus, a digital telephone subscriber will use the HSD segment for both voice and data (e.g., Internet) service. If the telephone subscriber is using a "softphone," the subscriber may be using the HSD segment for voice and Internet connectivity simultaneously.

While the Internet connectivity and digital telephone services are both HSD applications, the services tend to operate independently. That is, a subscriber taking digital telephone service from a digital telephone provider may not sense the relationship between the transport of the telephone call data and the transport of Internet-bound packets. What would be useful would be a system and method that leverages the use of one service to encourage use of the other.

In an embodiment hereof, digital telephone service and HSD service interact through the provision of caller identification (CID) information over an instant-messaging (IM) service. By way of illustration, CID information is sent through the IM service client. A "pop-up" message is displayed when a VoIP system or other telephony service detects an incoming call. A telephone subscriber can program his or her IM management to block CID pops from a list, selectively reject an incoming call, or use a variety of other features described below.

DETAILED DESCRIPTION

In an embodiment, a telephone subscriber registers with a digital telephone service provider (DTSP) to obtain telephone service. The telephone subscriber also registers with an instant messaging service provider (IMSP) and receives a screen name. In this embodiment, the IMSP has agreed to accept communications from the DTSP. The telephone subscriber registers the screen name with the DTSP to receive caller identification information (CID) via instant messaging (IM) (sometimes referred to herein as "CID IM service"). When a call to the telephone number of the telephone subscriber is received at a switch operated by the DTSP, the DTSP confirms that the telephone subscriber has registered a screen name with the DTSP and then sends the caller identification information to the IMSP. The IMSP then sends an instant message containing the caller identification information to the telephone subscriber's instant message client.

Figure 1:
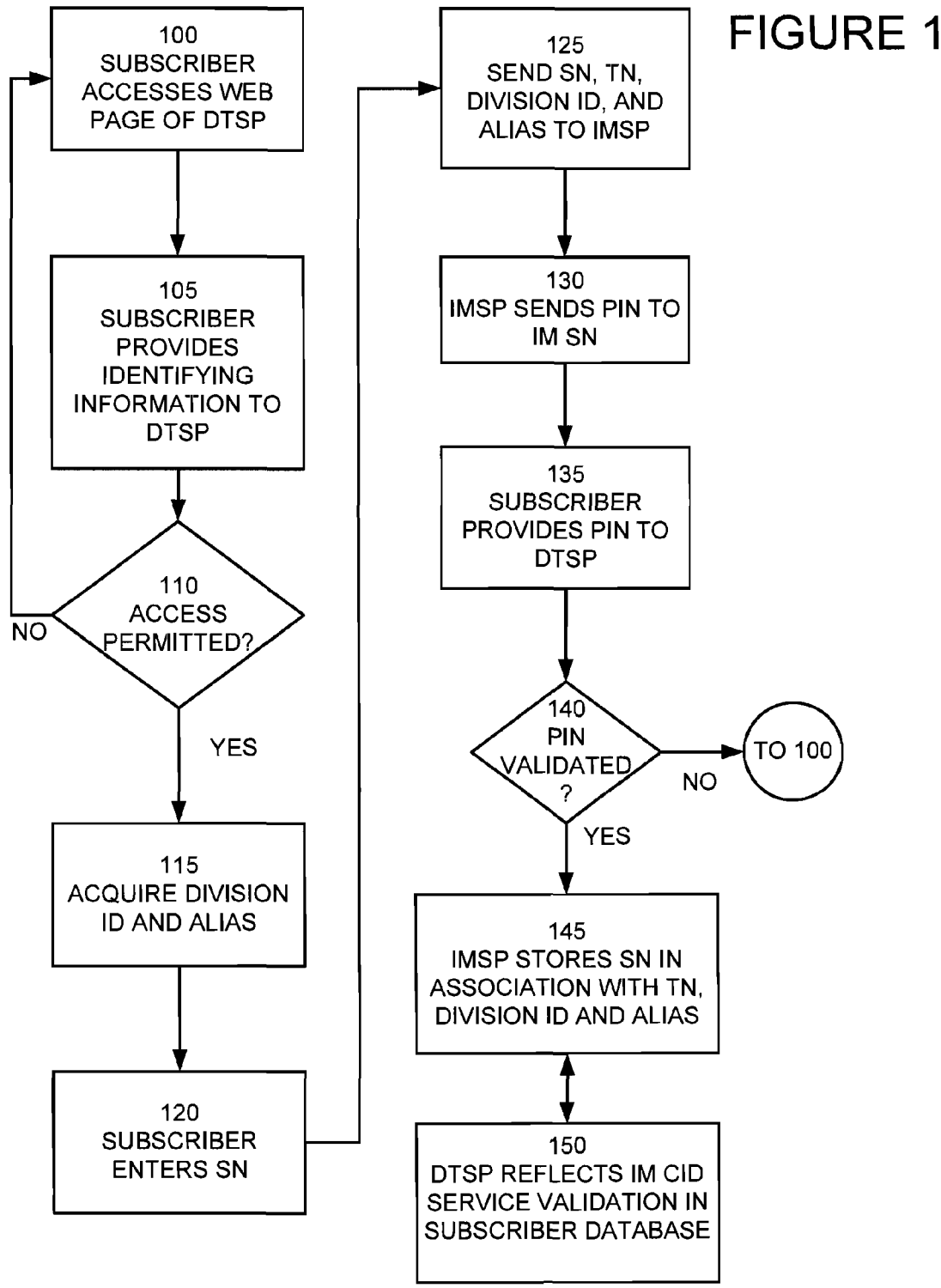
FIG. 1 illustrates a registration flow whereby a telephone subscriber registers an instant messaging screen name with a digital telephone service provider according to an embodiment hereof.

FIG. 1 illustrates a registration flow whereby a telephone subscriber registers an instant messaging screen name with a digital telephone service provider according to an embodiment hereof.

The telephone subscriber accesses a webpage 100 on a digital telephone web portal (DTWP) operated by the DTSP and provides telephone subscriber identifying information 105. For example, and not as a limitation, the telephone subscriber may provide a telephone number and a password to access the webpage. A determination is made as to whether the identifying information is correct 110. If the identifying information is correct, the DTWP acquires additional subscriber identifying information from a database 115. For example, the DTWP may associate the telephone subscriber with a division identifier to indicate the location of the switch that services the telephone subscriber and a telephone number alias (or nickname). If the telephone subscriber identifying information is not correct, the telephone subscriber is returned to the DTWP web page 100.

The webpage of the DTWP comprises data fields configured to receive data. The telephone subscriber enters a screen name in a "screen name" data field 120. The DTWP couples the screen name with the telephone subscriber's TN, division ID, and TN alias and sends this information to the IMSP 125. The IMSP responds to this communication from the DTWP by sending the telephone subscriber an instant message directed to the screen name entered in the data field 130. The instant message contains a personal identification number (PIN). The telephone subscriber enters the PIN in a "PIN" data field on the DTWP web page 135. The DTSP validates the PIN with the IMSP 140. If the telephone subscriber has provided the PIN to the DTSP that is associated with the screen name issued by IMSP, the IMSP will associate the screen name, the telephone number, division ID and TN alias in a database 145. The DTSP associates the telephone subscriber with CID IM service 150 in a telephone subscriber database. If the PIN is not validated, the telephone subscriber is returned to the DTWP web page 100.

In an embodiment, the DTWP limits the telephone subscriber to a preset maximum of PIN entry attempts. For example, a telephone subscriber may be permitted five failed PIN entry attempts after which the DTWP prohibits further entry attempts from the telephone subscriber for 24 hours.

In another embodiment, the DTWP prompts the telephone subscriber to log into the instant message client of the IMSP to enable the telephone subscriber to receive the PIN to validate the registration of the telephone subscriber with the CID IM service.

In yet another embodiment, the DTWP provides a link to the IMSP for telephone subscribers who are not registered with the IMSP and do not have a screen name or who desire a new screen name for receipt of caller identification information.

In still another embodiment, the DTWP provides data fields that allow a subscriber to cease receiving caller identification information via instant message, to add a telephone number to an existing registration, or to remove a telephone number from an existing registration.

Figure 2:
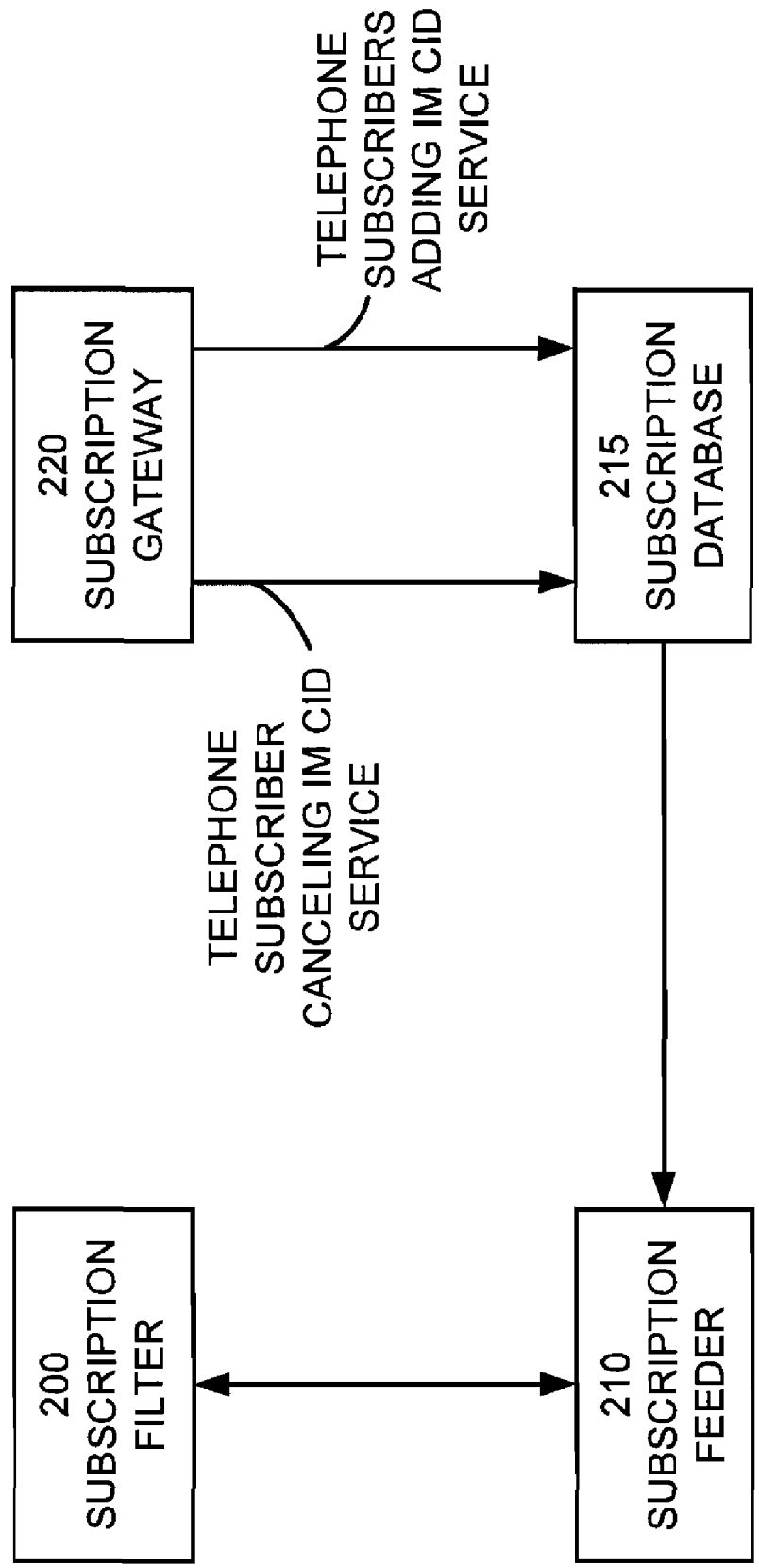
FIG. 2 illustrates a flow whereby changes to the CID IM service users are reflected in a subscription filter.

FIG. 2 illustrates a flow whereby changes to the CID IM service users are reflected in a subscription filter.

Subscription database 215 maintains records of telephone subscribers receiving digital telephone service from the DTSP. The records of telephone subscribers who have also subscribed to CID IM service may be flagged or may contain data, such as a screen name, that identifies the digital telephone subscriber as a validated CID IM service subscriber. Alternatively, the subscription database 215 may include a separate record of digital telephone subscribers who are validated CID IM service subscribers. A separate CID IM record would also be referenced by the digital telephone subscriber's phone number.

Subscription database 215 receives validated CID IM service subscribe/unsubscribe requests from subscription gateway 220 and updates the CID IM service records accordingly. For example, a subscription filter 200 connects to a subscription feeder 210 when the subscription filter 200 is first started and receives a complete list of telephone numbers of telephone service subscribers who are currently validated CID IM service subscribers. After this initial synchronization, the subscription feeder 210 will feed subscribe/unsubscribe notifications to the subscription filter 200 on a regular basis. The subscription database 215 is configured to push the subscribe/unsubscribe events to the subscription feeder 210 on a preset interval. The subscription feeder 210 receives the subscribe/unsubscribe events each interval and feeds them to the subscription filter 200. Alternatively, the subscription feeder 210 may be updated by polling.

The subscription filter may obtain a new list of CID IM subscribers from subscription feeder 210 or, alternatively, receive the most recent validated subscribe/unsubscribe requests received by subscription database 215 during the last update interval. Optionally, a validated subscribe/unsubscribe request may be time stamped to assure that the subscription filter is receiving the most timely data.

Operationally, the CID IM service may be disabled by the DTSP on certain conditions. For example, when a telephone line is cancelled, the DTSP will "unsubscribe" the screen name associated with the telephone number of the canceled line. In addition, the IMSP may unsubscribe screen names automatically if the associated telephone number is inactive for a set period. The unsubscribe function is accomplished by time stamping the last call received at the call handler server. For example, if the phone number associated with the screen name has not received any calls for the last 60 days, on the 61st day the IMSP will unsubscribe the screen names associated with that phone number. This process serves to prevent inadvertent linkage to a new subscriber after a telephone number has been aged and reused.

When a call to a telephone number of a telephone subscriber is received at a switch operated by the DTSP, the DTSP uses subscription filter 200 to determine whether the telephone subscriber associated with the called number is a CID IM service subscriber. If the called number is a number of a CID IM service subscriber, the CID filter forwards the CID information to the IMSP.

Figure 3:
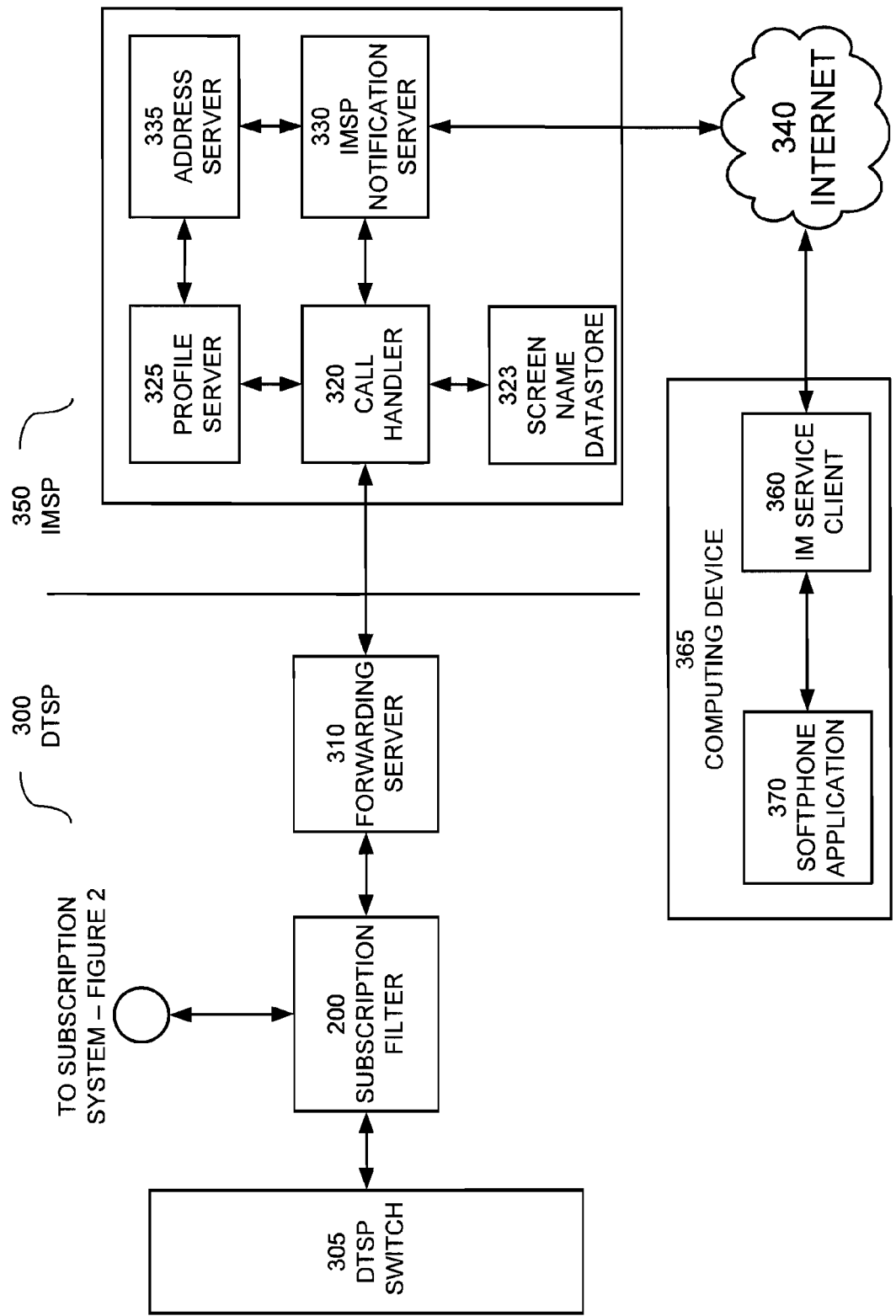
FIG. 3 illustrates the logical components of an exemplary system for providing caller identifying information via an instant message.

FIG. 3 illustrates the logical components of an exemplary system for providing caller identifying information via an instant message. As illustrated, certain logical components are identified as belonging to DTSP 300 and certain logical components are identified as belong to IMSP 350. However, the exemplary assignment of logical components is not meant to be limiting.

Referring to the exemplary system illustrated in FIG. 3, a call for a telephone subscriber is received by DTSP switch 305. In addition to processing the telephone call, DTSP switch 305 sends call alert data to subscription filter 200. Call alert data includes the CID information and information about the called party to permit subscription filter 200 to determine whether the called party is a subscriber of CID IM service. The call alert data may, for example, include the called party number and the calling party number. The subscription filter 200 parses the call alert data for the called party identifying information and compares the called party identifying information received from DTSP switch 305 to identifying information associated with CID IM service subscribers. If a match is found, CID information is sent to a forwarding server 310 operated by the DTSP. Forwarding server 310 receives the CID information and directs that data to call handler 320. Call handler 320 refers to datastore 323 to obtain a screen name associated with the called party telephone number.

Alternatively, the DTSP may create a service code for CID IM service. The CID IM service code is written to a subscriber record. When a call is received at switch 305, a query is made by subscription filter 200 to determine the subscription status of the CID IM service associated with the telephone subscriber. If the subscription status is "false," no message will be forwarded to the IMSP. If the subscription status is "true," the message will be forwarded to call handler 320.

While FIG. 3 illustrates a single IMSP 350, the DTSP 300 may have arrangements with any number of IMSPs. In that case, the CID IM subscriber would be associated with the IMSP that issued the screen name associated with the call party's telephone number. The association of the CID IM subscriber with an IMSP could be maintained by the subscription filter 200, the subscription database 215 (see, FIG. 2), or the forwarding server 310. Regardless of where the subscriber/IMSP association is maintain, in such an environment, forwarding server 310 would also route the CID information to the call handler 320 located at the appropriate IMSP.

The CID information that is forwarded to the IMSP from the DTSP includes information that the DTSP's switch (see, FIG. 3, element 305) derives from the incoming call as well as information that may be acquired by DTSP 305 switch from other data sources. For example, referring to FIG. 3, the DTSP switch 305 may acquire the calling party telephone number from the incoming call data and acquire data indicative of a location of a central office associated with the calling party number from a separate server. Other caller identifying information that may be obtained by DTSP switch 305 includes, by way of illustration and not as a limitation, a calling party name, a calling party nickname, and an image associated with the calling party.

Alternatively, DTSP switch 305 may provide information derived from the incoming call while other caller identifying information is provided by the subscription filter 200, the forwarding server 310, and the address server 335.

In an exemplary embodiment, the communications between the logical elements of the DTSP 300 and the IMSP 350 are performed using a session initiation protocol (SIP). In this embodiment, subscription filter 200 sends an INVITE message that includes the CID information to forwarding server 310. The INVITE message is forwarded to call handler 320. For added security, the INVITE message may be sent over a secure path such as an IPSEC tunnel. The call handler 320 parses the body of the INVITE message to obtain the CID information, acquires the screen name associated with the called party telephone number from screen name datastore 323, and forwards the screen name and the CID information to notification IMSP server 330.

The call handler 320 may communicate with profile server 325 prior to sending the CID instant message to the IM service client 360 of CID IM service subscriber. Profile server 325 stores a configuration record associated with a particular screen name. Call handler 320 may refer to profile server 325 to determine whether the CID IM subscriber has established processing rules affecting the display and management of CID messages and CID information. For example, a profile may establish processing rules that pass or block CID instant messages based on a time of day, a calling party name, a calling party number, or a location of a caller. In response to the processing rules established by the subscriber, call handler 320 may modify the CID information before sending it to IMSP notification server 330 or discard the CID information in response to a blocking profile.

Address server 335 comprises data that relates the area code and the prefix portion of a telephone number with a physical location. Alternatively, address server 335 comprises software that allows address server 335 to access this data remotely. Profile server 325 may contact address server 335 to determine the location of a central office associated with the calling party number when required to execute a display rule based on calling party location. IMSP notification server 330 may contact address server 335 prior to sending the CID IM to the IM service client 360 of the CID IM subscriber to determine the location associated with the called number and to include the location information in the CID instant message sent to the screen name associated with the called party.

As described above, the location information of a central office associated with the calling party number may be included in the CID information received by call handler 320. In this case, the address server 335 would not be used.

The notification server 330 sends a CID instant message to the screen name containing the CID information to the digital telephone subscriber via the Internet 340 for display on IM service client 360. For example, an exemplary CID instant message has the following field structure: SourceScreenName: "<CallingPartyName>, <City>, <State> (<CallingPartyNumber>) is calling <Nickname>." The instant message displayed on IM service client 360 would appear as follows: DTSP_CID: "John Smith, Los Angeles, Calif. (555-555-5555) is calling My Home line." Where a telephone subscriber does not enter a nickname during setup, the telephone subscriber's telephone number will be displayed in the nickname field.

In an embodiment, the CID information comprises a presentation-restricted indicator. In this instance, the calling party has elected not to permit CID information to be conveyed in the telephone communication. When a call comprising a presentation-restriction is received, the CID instant message conveys a message indicating that a call has been received but that the caller has elected to remain anonymous.

FIG. 3 illustrates single instances of the logical components of an exemplary system for providing caller identifying information via an instant message. Multiple instances of these components may be used to provide redundancy and to improve operational performance.

Other features of the IM service client 360 may be utilized in conjunction with the receipt of the instant messages comprising the caller alert data. For example, a processing rule stored in profile server 325 may direct that calls from a particular number be sent to voicemail. The IM service client may be configured to provide a notification when the voicemail is stored and offer an audio or textual version of the voicemail to the subscriber.

In an exemplary embodiment, the IM service client 360 and a softphone application 370 reside on a computing device 365. By way of illustration and not as a limitation, the computing device 365 may be a desktop computer, a laptop computer, a handheld computer and a personal digital assistant (PDA) to name but a few. When a CID instant message is received by the IM service client 360, the IM subscriber is provided an option to route the incoming call to the softphone application 370. For example, a clickable icon may be displayed on a tool bar of the IM service client 360 or the IM service client 360 may present the IM user a pop-up icon for this purpose.

When the IM subscriber accepts the option to route the call to the softphone application 365, the softphone application 365 is launched and a SIP invite message is sent from IM service client 360 to IMSP notification server 330. The invite message is passed through call handler 320, forwarding server 310, and subscription filter 200 to DTSP switch 305. The SIP invite message comprises the IP address of computing device 365. DTSP switch 305 responds with an acknowledgement message to establish a session with computing device 365. The telephone call packets are routed between computing device 365 and DTSP switch 305 over the Internet 340 with call handler 320 performing the functions of a SIP proxy server. The session at computing device 365 is managed by softphone application 365.

The ability to invoke the softphone application 370 from the IM service client 360 makes possible additional features and services. For example, the softphone application 370 may be invoked to return missed calls or to call parties selected from a call list. The DTSP switch 305 may be instructed to forward selected calls to computing device 365 based on the CID information of the incoming call.

It will be understood by those skilled in the art that the present invention may be, without limitation, embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A method for forwarding a call in a digital telephone network comprising:
    capturing from an incoming telephone communication a called telephone number;
    acquiring caller identification (CID) information related to the telephone communication;
    determining whether the called telephone number is associated with an IM screen name;
    forming a CID instant message comprising at least one element of the CID information when the called telephone number is associated with an IM screen name;

sending the CID instant message addressed to the screen name to an IM service client;
receiving a request from the IM client to route the telephone communication to a softphone application;
issuing a call to the softphone application in response to the request;
receiving at the softphone application calling party call data packets;
originating at the softphone application called party call data packets; and
sending the called party call data packets to calling party.

2. The method of claim 1, wherein the CID information is selected from the group consisting of a calling party telephone number, a calling party name, a calling party nickname, calling party location information, an image associated with the calling party, and a message indicating that a calling party has blocked transmission of information relating to the telephone communication in the incoming call.

3. The method of claim 1, wherein the at least one element of the CID information is selected from the group consisting of a calling party telephone number and a calling party name.

4. The method of claim 1, wherein acquiring CID information related to the telephone communication comprises:
obtaining a calling party telephone number from the incoming telephone communication; and
determining a city and state of origin of the calling party from the calling party telephone number, and
wherein forming the CID instant message comprising at least one element of the CID information comprises forming the CID instant message comprising the city and state of origin of the calling party and the at least one element of the CID information.

5. A system for forwarding a call in a digital telephone network comprising:
a telephone switch, wherein the telephone switch comprises instructions for:
capturing a called telephone number; and
acquiring caller identification (CID) information related to a telephone communication;
an instant message notification server connected to a call handler;
an IM service client connected to the instant message notification server via the second; and
a softphone application accessible to the IM service client,
a subscription filter, wherein the subscription filter comprises instructions for:
receiving the called telephone number and the CID information related to a telephone communication from the telephone switch;
determining whether the called telephone number is associated with a service subscriber who also subscribes to the CID IM service; and
sending the CID information to the call handler when the called telephone number is associated with the service subscriber who also subscribes to the CID IM service,
wherein the call handler comprises instructions for:
receiving the CID information;
obtaining an IM screen name associated with the service subscriber who also subscribes to the CID IM service; and
sending the screen name and at least one element of the CID information to the instant message notification server,
wherein the instant message notification server comprises instructions for:
forming a CID instant message comprising the at least one element of the CID information; and
sending the CID instant message to the IM service client associated with the screen name,
wherein the IM service client comprises instructions for:
receiving a request to route the telephone communication to the softphone application; and
issuing a call to the softphone application in response to the request, and
wherein the softphone application comprises instructions for:
receiving calling party call data packets;
originating called party call data packets; and
sending the called party call data packets to calling party.

6. The system of claim 5, wherein the CID information is selected from the group consisting of a calling party telephone number, a calling party name, a calling party nickname, calling party location information, an image associated with the calling party, and a message indicating that a calling party has blocked transmission of information relating to the telephone communication in the incoming call.

7. The system of claim 5, wherein the at least one element of the CID information is selected from the group consisting of the calling party telephone number and the calling party name.

8. The system of claim 5, wherein acquiring CID information related to the telephone communication comprises:
obtaining a calling party telephone number from the incoming telephone communication; and
determining a city and state of origin of the calling party from the calling party telephone number, and
wherein forming the CID instant message comprising at least one element of the CID information comprises forming the CID instant message comprising the city and state of origin of the calling party and the at least one element of the CID information.

* * * * *

UNITED STATES PATENT AND TRADEMARK OFFICE
CERTIFICATE OF CORRECTION

PATENT NO. : 8,270,581 B2
APPLICATION NO. : 12/021335
DATED : September 18, 2012
INVENTOR(S) : Howard Pfeffer et al.

Page 1 of 1

It is certified that error appears in the above-identified patent and that said Letters Patent is hereby corrected as shown below:

Column 7, claim 5, line 42, delete the words "via the second".

Signed and Sealed this
Twenty-sixth Day of February, 2013

Teresa Stanek Rea
*Acting Director of the United States Patent and Trademark Office*